Oct. 30, 1928.
F. HEATH
1,689,920
FISH DIRECTING APPARATUS
Filed Dec. 7, 1926
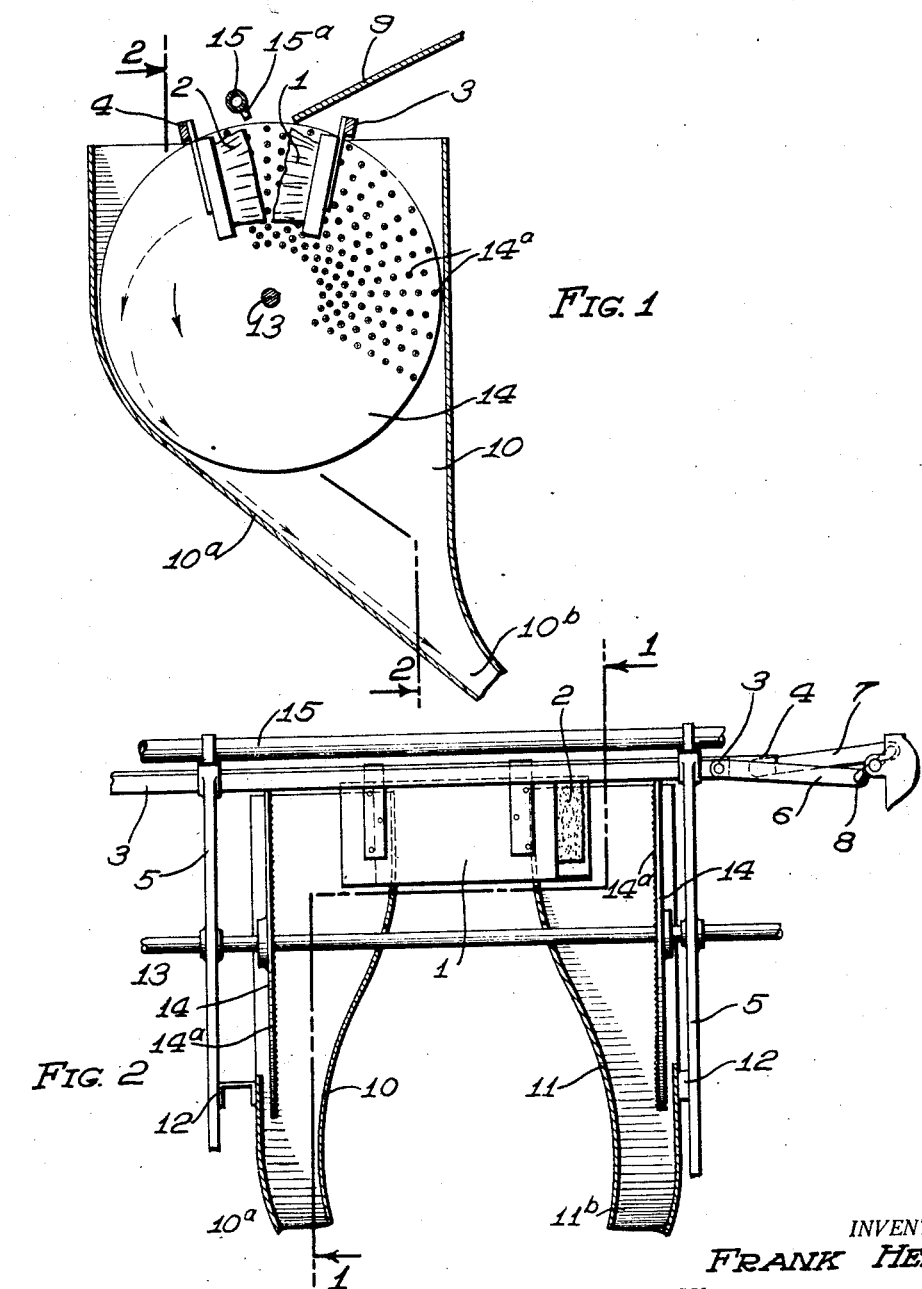
INVENTOR.
FRANK HEATH
BY A.B. Bowman
ATTORNEY Patented Oct. 30, 1928.

1,689,920

UNITED STATES PATENT OFFICE.

FRANK HEATH, OF NATIONAL CITY, CALIFORNIA.

FISH-DIRECTING APPARATUS.

Application filed December 7, 1926. Serial No. 153,057.

My invention relates to an apparatus for directing the heads of fish in one direction.

The primary object of this invention is to provide improvements over my co-pending application for fish segregating, directing, guiding and turning apparatus, filed in the United States Patent Office June 25th, 1925, Serial No. 39,557.

The objects of my improvements are: first, to provide an apparatus of this class in which fish are received with their heads pointed in different directions, and which will direct the fish in such a manner that their heads will be pointed in one direction so that the same may be handled with greater facility; second, to provide an apparatus of this class which will mechanically direct fish from a means, in which the heads of the fish are directed in certain directions, into a chute means from which the fish are directed head foremost into other apparatus; third, to provide a revoluble means which will engage the heads of fish from a means, in which the heads are directed in certain directions into a curved and inclined chute from which the fish are directed with their heads foremost into other apparatus; and fourth, to provide as a whole a novelly constructed apparatus for directing heads of fish in one direction and an apparatus of this class which is particularly simple and economical of construction, durable, positive in its action and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary transverse sectional elevational view of my apparatus taken on the line 1—1 of Fig. 2, and Fig. 2 is a fragmentary sectional elevational view thereof taken on the line 2—2 of Fig. 1.

Like characters of reference refer to similar parts and portions throughout the views of the drawings.

The fish directing brushes 1 and 2, brush supports 3 and 4, supports 5, connecting links 6 and 7, crank 8, fish supply plate 9, chutes 10 and 11, chute supports 12, shaft 13, fish head engaging and directing members 14, and the water supply conductor 15 constitute the principal parts and portions of my fish directing apparatus in its preferred form.

The brushes 1 and 2 are preferably flat rectangularly shaped brushes with relatively long and relatively stiff bristles. These brushes, there being two of identical construction, are oppositely disposed with their bristles extending toward each other. Said brushes are so positioned that a V-shaped recess or channel is provided between the same for receiving fish flat-wise from the fish supply plate 9, or other suitable means. Said brushes 1 and 2 are supported at their back sides on oppositely reciprocating brush supports or guide rods 3 and 4 respectively. Said supports or guides 3 and 4 are reciprocally mounted on suitable supports 5 and are pivotally connected by means of links 6 and 7 respectively, with throw portions of a crank 8. Thus, it will be seen that the brushes are continuously reciprocated in short strokes in opposite directions. The fish falling flatwise between the brushes from the plate 9 are carried, and in the direction of, the brush engaging the free or exposed edges of the scales of the fish. The fish are carried head foremost alternately by the oppositely disposed brushes to the coincident ends thereof, from which they are adapted to drop head foremost into one or the other of the receptacles or chutes 10 and 11 which may be supported in any suitable manner, such as by means of supports 12 on the supports 5.

The upper ends of the receptacles or chutes 10 and 11 are flared outwardly forming substantially funnel shaped portions to facilitate the direction of the fish from the brushes into the chutes. The chutes may be separate, if desired, or the same may be connected at their upper ends underneath the brushes.

In the funnel shaped portions of the chutes are positioned fish head engaging and directing members 14 which, as shown, are disc shaped members mounted on and revolved by a shaft 13 revolubly mounted on the supports 5. The sides of the members or discs 14 are positioned transversely with the direction of reciprocation of the brushes and are adapted to be engaged by the noses of the fish as the same are projected beyond the ends of the brushes. The discs 14 are spaced sufficient distances from the ends of the brushes so that the body of the fish can be bent readily in the direction of revolution of the discs and carried with the latter when the fish are released by the brushes. To facilitate the action of the discs on the noses of the fish, there are provided on the sides of the discs facing the brushes multitudinous pointed portions 14ª which may be formed by prick punching the outer sides of the discs inwardly. Other roughened or pointed portions, or even bristles may be provided on the brush sides of the discs so as to positively engage or grip the noses of the fish when the same are projected against the discs.

The shaft for supporting and rotating the fish directing members or discs is preferably below the brushes and revolves preferably in the direction of the arrow so that the fish received initially from one side of the apparatus may be returned with a minimum of travel to the same side. The dashed arrows in Fig. 1 show approximately the path of the fish after the same leave the brushes. It will be noted that the fish are directed against the wall at the outer side of the chute. The wall of the chute 10, indicated by 10ª in Fig. 1, at the normally outer side of the chute is inclined at a sharp angle and merges with the upper portion of the wall in gradual curves. Thus, as the fish is directed against the normally outer wall, the same follows the curve and inclined wall of the chute until the same is discharged at the constricted discharge portion 10ᵇ at the lower end of the chute. The lower ends of the chutes 10 and 11 are preferably directed toward each other, as shown in Fig. 2, so that the fish from one unit of the machine may be re-directed into another unit for further operation.

It will be here noted that the apparatus shown and described prevents the fish from leaving the brushes or other directing means without proper direction and mechanically controlled directing means, and prevents fish from turning end for end and prevents the same from doubling up.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an apparatus of the class described, a means for receiving individual fish pointed in different directions and for directing the same with the heads foremost, a chute, and movable means in connection with the first means and said chute adapted to be engaged by the heads of the fish from the first means for redirecting the same from the first means into said chute.

2. In an apparatus of the class described, a means for receiving individual fish pointed in different directions and for directing the same with the heads foremost, a chute, and a revoluble member at one end of said means adapted to be engaged at one side intermediate its periphery by the heads of fish therein for redirecting the fish from said means into said chute.

3. In an apparatus of the class described, a means for receiving individual fish pointed in different directions, a chute, and a revoluble member positioned at one end of said means and provided at the side adjacent said means with roughened portions, the roughened portions of said revoluble member being adapted to be engaged by the heads of fish from said means for bending said fish and directing the same into said chute.

4. In an apparatus of the class described, a means for receiving individual fish pointed in different directions, and a revoluble member positioned at one end of said means and provided at the side adjacent said means with roughened portions, the roughened portions of said revoluble member being adapted to be engaged by the heads of fish from said means for bending said fish and directing the same.

5. In an apparatus of the class described, a pair of oppositely disposed, inclined, and oppositely reciprocating brushes, revoluble members positioned at the opposite ends of said brushes and spaced therefrom, and a receptacle in connection with said revoluble members, said revoluble members being adapted to be engaged by the noses of fish carried by said brushes for directing the same into said receptacle.

6. In an apparatus of the class described, a pair of oppositely disposed, inclined, and oppositely reciprocating brushes, revoluble members positioned at the opposite ends of said brushes and spaced therefrom, and fish directing chutes provided with funnel shaped portions at their upper ends, said funnel shaped portions being positioned around said revoluble members, said revoluble members being so positioned relative to said brushes as to be engaged by the heads of fish carried thereby for directing said fish into said chutes.

7. In an apparatus of the class described, a pair of oppositely disposed, inclined, and oppositely reciprocating brushes, fish directing members revolubly mounted adjacent the opposite ends of said brushes with their axes of revolution parallel with the direction of reciprocation of said brushes, and fish receiving means adjacent the sides of said revoluble fish directing means, said sides of said revoluble members being provided with roughened portions adapted to be engaged by the heads of fish from said brushes for bending said fish and directing the same into said fish receiving means.

8. In an apparatus of the class described, a means for receiving individual fish and for directing the same with their heads foremost, a chute, and means in connection with the first means and said chute movably mounted directly in the path of said fish and substantially at a right angle to said path adapted to be engaged by the heads of the fish from the first means for redirecting the same from the first means into said chute.

In testimony whereof, I have hereunto set my hand at San Diego, California, this 27th day of November, 1926.

FRANK HEATH.